United States Patent
Jayasekara

(10) Patent No.: US 7,035,063 B2
(45) Date of Patent: *Apr. 25, 2006

(54) MAGNETIC TUNNEL JUNCTION SENSOR WITH NICKEL-OXIDE LONGITUDINAL BIAS LAYER ABUTTING OPPOSITE SIDES OF ACTIVE REGION

(75) Inventor: Wipul Jayasekara, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/622,034

(22) Filed: Jul. 16, 2003

(65) Prior Publication Data

US 2004/0012897 A1    Jan. 22, 2004

Related U.S. Application Data

(62) Division of application No. 09/848,674, filed on May 3, 2001, now Pat. No. 6,833,982.

(51) Int. Cl.
*G11B 5/39* (2006.01)

(52) U.S. Cl. ............... 360/324.2; 360/324.12

(58) Field of Classification Search ............. 360/324.2, 360/324.12
See application file for complete search history.

(56) References Cited

U.S. PATENT DOCUMENTS

| | | | |
|---|---|---|---|
| 6,249,407 B1* | 6/2001 | Aoshima et al. | 360/324.2 |
| 6,542,342 B1* | 4/2003 | Hayashi et al. | 360/324.2 |
| 6,556,391 B1* | 4/2003 | Aoshima et al. | 360/324.2 |
| 6,650,513 B1* | 11/2003 | Fullerton et al. | 360/324.2 |
| 6,661,626 B1* | 12/2003 | Gill | 360/324.2 |
| 2001/0014001 A1* | 8/2001 | Aoshima et al. | 360/324.2 |
| 2001/0021089 A1* | 9/2001 | Miyauchi et al. | 360/324.2 |
| 2002/0154456 A1* | 10/2002 | Carey et al. | 360/324.2 |

* cited by examiner

*Primary Examiner*—Craig A. Renner
(74) *Attorney, Agent, or Firm*—Zilka-Kotab, PC

(57) ABSTRACT

A magnetic tunnel junction (MTJ) sensor in which the free layer longitudinal biasing elements are coupled, without insulation, to the free layer outside of the MTJ stack to provide reliable non-shunting MTJ free layer stabilization without extremely thin dielectric layers. In one embodiment, hard magnetic (HM) layers are disposed in contact with the free layer outside of and separated from the MTJ stack active region by a thick dielectric layer. In another embodiment, antiferromagnetic (AFM) bias layers are disposed in contact with the free layer outside of and separated from the MTJ stack active region by a thick dielectric layer. In other embodiments, nonconductive HM layers are disposed either in contact with the free layer outside of the MTJ stack active region and/or in abutting contact with the MTJ stack active region.

2 Claims, 6 Drawing Sheets

MAGNETIC TUNNEL JUNCTION SENSOR WITH NICKEL-OXIDE LONGITUDINAL BIAS LAYER ABUTTING OPPOSITE SIDES OF ACTIVE REGION

REFERENCE TO RELATED APPLICATION

This is a divisional application of application 09/848,674, filed May 3, 2001 now U.S. Pat. No. 6,833,982.

BACKGROUND OF THE INVENTION

1. Field of the Invention

This invention relates generally to a magnetic tunnel junction (MTJ) device and more particularly to an MTJ device for use as a magnetoresistive (MR) head for reading magnetically-recorded data.

2. Description of the Related Art

Computers often include auxiliary memory storage devices having media on which data can be written and from which data can be read for later use. A direct access storage device (DASD or disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive (MR) read sensors (MR heads) are preferred in the art because of their capability to read data at greater track and linear densities than earlier thin film inductive heads. An MR sensor detects the magnetic data on a disk surface through a change in the MR sensing layer resistance responsive to changes in the magnetic flux sensed by the MR layer.

The early MR sensors rely on the anisotropic magnetoresistive (AMR) effect in which an MR element resistance varies as the square of the cosine of the angle between the magnetic moment of the MR element and the direction of sense current flowing through the MR element. Recorded data can be read from a magnetic medium because the external magnetic field from the recorded magnetic medium (the signal field) changes the moment direction in the MR element, thereby changing the MR element resistance and the sense current or voltage.

The later giant magnetoresistance (GMR) sensor relies on the spin-scattering effect. In GMR sensors, the resistance of the GMR stack varies as a function of the spin-dependent transmission of the conduction electrons between two magnetic layers separated by a non-magnetic spacer layer and the accompanying spin-dependent scattering that occurs at the interface of the magnetic and non-magnetic layers and within the magnetic layers. GMR sensors using only two layers of ferromagnetic (FM) material separated by a layer of non-magnetic conductive material (e.g., copper) are generally referred to as spin valve (SV) sensors.

In 1995, a new class of high magnetoresistive (MR) materials was discovered in which the nonmagnetic layer separating the two FM layers is made with an ultrathin nonconductive material, such as an aluminum oxide layer <20 Å thick. With the switching of magnetization of the two magnetic layers between parallel and antiparallel states, the differences in the tunneling coefficient of the junction and thus the magnetoresistance ratio have been demonstrated to be more than 25%. A distinctive feature of this magnetic tunnel junction (MTJ) class of materials is its high impedance ($>100$ k$\Omega$-$\mu m^2$), which allows for large signal outputs.

A MTJ device has two ferromagnetic (FM) layers separated by a thin insulating tunnel barrier layer. MTJ operation relies on the spin-polarized electron tunneling phenomenon known in the art. One of the two FM layers (the reference layer) has a higher saturation field in one direction because of, for example, a higher coercivity, than the other FM layer (the sensing layer), which is more free to rotate in response to external fields. The insulating tunnel barrier layer is thin enough so that quantum mechanical tunneling occurs between the two FM layers. The tunneling phenomenon is electron-spin dependent, making the magnetic response of the MTJ a function of the relative moment orientations and spin polarizations of the two FM layers.

When used as memory cells, the MTJ memory cell state is determined by measuring the cell resistance to a sense current passed perpendicularly through the MTJ from one FM layer to the other. The charge carrier probability of tunneling across the insulating tunnel barrier layer depends on the relative alignment of the magnetic moments (magnetization directions) of the two FM layers. The tunneling current is spin polarized, which means that the electrical current passing from one of the FM layers, for example, the reference layer whose magnetic moment is pinned to prevent rotation, is predominantly composed of electrons of one spin type (spin up or spin down, depending on the reference orientation of the magnetic moment). The degree of spin polarization of the tunneling current is determined by the electronic band structure of the magnetic material composing the FM layer at the interface of the FM layer with the tunnel barrier layer. The FM reference layer thus acts as a spin filter for tunneling electrons. The probability of tunneling of the charge carriers depends on the availability of electronic states of the same spin polarization as the spin polarization of the electrical current in the FM sensing layer. When the magnetic moment of the FM sensing layer is parallel to that of the FM reference layer, more electronic states are available than when the two FM layer magnetic moments are antiparallel. Accordingly, charge carrier tunneling probability is highest when the magnetic moments of both layers are parallel and is lowest when the magnetic moments are antiparallel. Between these two extremes, the tunneling probability assumes some intermediate value, so that the electrical resistance of the MTJ memory cell depends on both the sense current spin polarization and the electronic states in both FM layers. As a result, the two orthogonal moment directions available in the free FM sensing layer together define two possible bit states (0 or 1) for the MTJ memory cell. Serious interest in the MTJ memory cell has lagged for some time because of difficulties in achieving useful responses in practical structures at noncryogenic temperatures.

The magnetoresistive (MR) sensor known in the art detects magnetic field signals through the resistance changes of a read element, fabricated of a magnetic material, as a function of the strength and direction of magnetic flux sensed by the read element. The conventional MR sensor, such as that used as a MR read head for reading data in magnetic recording disk drives, operates on the basis of the anisotropic magnetoresistive (AMR) effect of the bulk magnetic material, which is typically permalloy ($Ni_{81}Fe_{19}$). A component of the read element resistance varies as the square of the cosine of the angle between the magnetization direction in the read element and the direction of sense current through the read element. Recorded data can be read from a magnetic medium, such as the disk in a disk drive, because the external magnetic field from the recorded magnetic medium (the signal field) causes a change in the direction of magnetization in the read element, which in turn causes a change in resistance of the read element and a corresponding change in the sensed current or voltage.

The use of an MTJ device as a MR read head is also well-known in the art. One of the problems with the MTJ read head is the difficulty encountered in developing a sensor structure that generates an output signal that is both stable and linear with respect to the magnetic field strength sensed in the recorded medium. Some means is required to stabilize the magnetic domain state of the MTJ free FM sensing layer to prevent unacceptable Barkhausen noise arising from shifting magnetic domain walls within the free sensing layer. Also, some means for achieving a substantially linear response of the head is necessary for acceptable sensitivity. The longitudinal stabilization problem is particularly difficult in an MTJ MR read head because, unlike an AMR sensor, the MTJ sense current passes perpendicularly through the stack of FM and tunnel barrier layers so that any metallic materials in direct contact with the edges of the FM layers act to shunt (short-circuit) the read head sense resistance.

Practitioners have proposed several methods for resolving these problems to permit the use of MTJ sensors in magnetic read head applications. For example, in U.S. Pat. No. 5,729,410 (and later, in U.S. Pat. No. 6,005,753), Fontana, Jr. et al. describe a MTJ device where the sensing (free) FM layer magnetic moment is longitudinally biased by a layer of hard FM material located near but separated slightly from the side edges thereof (and later, from the back edge thereof for added transverse biasing) by an intervening layer of electrically insulating material. The insulating layer isolates the hard biasing material from the electrical leads and the sensing FM layer to prevent shunting of the sense current to the hard biasing material without interfering with the perpendicular sense current flow through the layers in the stack. Similarly, in U.S. Pat. No. 6,097,579, Gill proposes sandwiching a permanent magnet layer between two thin dielectric layers to provide longitudinal baising of the MTJ free layer. However, the Fontana, Jr, et al. and the Gill approaches are problematic to manufacture because they generally rely on extremely thin insulation layers to allow sufficient magnetostatic coupling to reduce Barkhausen noise in the free FM layer without shunting the sense current.

FIG. 1A shows an illustrative embodiment of a magnetic tunnel junction (MTJ) sensor 10 from the prior art. Sensor 10 is viewed from the air bearing surface (ABS) so that, in operation, the magnetic medium (not shown) moves in the image plane vertically with respect to MTJ sensor 10, MTJ sensor 10 includes an MTJ stack 12 disposed between a first shield (S1) layer 14 and a second shield (S2) layer 16. MTJ stack 12 may be characterized as an upper electrode 18 separated from a lower electrode 20 by a tunnel barrier 22. Upper electrode 18 includes a ferromagnetic (FM) pinned layer (PL) 24 having a magnetic moment that is pinned by an exchange-coupled antiferromagnetic (AFM) layer (AF) 26, and a second lead (L2) layer. The lower electrode 20 includes a FM free layer 30 and a first lead (L1) layer 32. MTJ stack 12 operates in the usual manner known in the art except that the stabilization biasing of free layer (FL) 30 is provided by a hard magnetic (HM) layer 34 disposed on each side of MTJ stack 12. To prevent a loss of sensitivity from undesired sense current shunting, HM layers 34 are sandwiched between two insulating layers 36 and 38 substantially as shown. Practitioners in the art can readily appreciate that the several layers outside of MTJ stack 12 should be precisely created in a series of steps following an initial etching procedure. The usual processes known in the art give rise to misalignment between the narrow ends of the various layers at the edges of MTJ stack 12, leading to unit performance variations and high unit rejection rates.

FIG. 1B shows an air bearing surface (ABS) view of another illustrative embodiment of a MTJ sensor 40 from the prior art. MTJ sensor 40 can be considered to include the end regions 42 and 44 separated from each other by a central region 46. The active region of MTJ sensor 40 is the MTJ stack 48 formed in the central region 46. MTJ stack 48 has a generally rectangular shape with a front face (shown) at the ABS, a back edge (not shown) opposite to the front edge and two opposite side edges 50 and 52. MTJ stack 40 includes a first electrode 54 and a second electrode 56 between which is disposed a tunnel baffler layer 58. First electrode 54 includes a pinned layer 60, an AFM layer 62 and a seed layer 64, where pinned layer 60 is disposed between tunnel barrier layer 58 and MM layer 62, which is disposed between pinned layer 60 and seed layer 64. Second electrode 56 includes a free layer 66 and a cap layer 68, where free layer 66 is disposed between tunnel baffler layer 58 and cap layer 68. AFM layer 62 is exchange coupled to pinned layer 60 providing an exchange field to pin the magnetization direction of pinned layer 60 perpendicular to the ABS. The magnetization of free layer 66 is oriented parallel to the ABS (absent other external magnetic fields) and is free to rotate in the presence of a signal magnetic field. As with MTJ sensor 10 (FIG. 1A), free layer stabilization bias is provided by the (H.B.) layers 70, which are sandwiched between the insulation layers (I2) 72 and 74 to prevent sensitivity losses through shunting of MTJ stack 48.

In U.S. Pat. No. 5,930,087, Brug et al. disclose a flux-guide MTJ sensor having a FM free layer that extends beyond the active region (MTJ stack) to the sides and also to the rear and the front (to the ABS). They suggest in passing that the longitudinal biasing layer placed on the flux guide adjacent to each side of a flux-guide MTJ stack may consist of antiferromagnetic materials such as terbium-iron or nickel-oxide (a nonconductor), but Brug et al. appear to prefer using antiferromagnetic (AFM) manganese compounds or permanent magnetic layers and neither consider nor suggest specific solutions to the MTJ sense current shunting problem arising from such MTJ sensor geometries.

There is accordingly a need in the MR sensor art for an effective MTJ longitudinal biasing technique that can be implemented using simpler, more reliable fabrication methods leading to higher yields and more consistent unit performance without the sensitivity loss arising from sense current shunting. These unresolved problems and deficiencies are clearly felt in the art and are solved by this invention in the manner described below.

SUMMARY OF THE INVENTION

This invention solves magnetic tunnel junction (MTJ) longitudinal biasing problem by coupling, without insulation, the biasing elements to the free layer outside of the MTJ stack to avoid shunting the tunnel current passing through the MTJ stack.

It is a purpose of this invention to provide reliable MTJ free layer stabilization without extremely thin dielectric layers to prevent unwanted shunting of tunnel current.

In one aspect, the invention is a MTJ sensor in a magnetic read head in a magnetic read head having an air bearing surface (ABS), the MTJ sensor including a MTJ stack with an active region disposed at the ABS and having two opposite sides each disposed generally orthogonally to the ABS, the MTJ stack including an antiferromagnetic (AFM) layer spanning the active region, a pinned layer of ferromagnetic (FM) material in contact with the AFM layer, a free layer of FM material spanning the active region and extending beyond each of the two opposite sides thereof, and a tunnel junction layer of electrically nonconductive material disposed between the pinned layer and the free layer in the active region, the MTJ sensor further including a longitudinal bias layer formed on and in contact with the free layer outside of the active region for biasing the magnetic moment of the free layer in substantially a predetermined direction in the absence of an external magnetic field.

In another aspect, the invention is a MTJ sensor in a magnetic read head having an ABS, the MTJ sensor including a MTJ stack with an active region disposed at the ABS and having two opposite sides each disposed generally orthogonally to the ABS, the MTJ stack including an AFM layer spanning the active region, a pinned layer of FM material in contact with the AFM layer, a free layer of FM material spanning the active region, and a tunnel junction layer of electrically nonconductive material disposed between the pinned layer and the free layer in the active region, the MTJ sensor further including a nonconductive longitudinal bias layer formed outside of the active region and in abutting contact with the two opposite sides of the active region for biasing the magnetic moment of the free layer in substantially a predetermined direction in the absence of an external magnetic field.

In yet another aspect, the invention is a direct access storage device (DASD) including a magnetic recording disk having at least one surface for storing magnetically recorded data, a magnetic read head having an ABS disposed for reading the data from the magnetic recording disk surface, the magnetic read head including a MTJ sensor having a MTJ stack with an active region disposed at the ABS and having two opposite sides each disposed generally orthogonally to the ABS, the MTJ stack including an AFM layer spanning the active region, a pinned layer of FM material in contact with the AFM layer, a free layer of FM material spanning the active region and extending beyond each of the two opposite sides thereof, and a tunnel junction layer of electrically nonconductive material disposed between the pinned layer and the free layer in the active region, the MTJ sensor further including a longitudinal bias layer formed on and in contact with the free layer outside of the active region for biasing the magnetic moment of the free layer in substantially a predetermined direction in the absence of an external magnetic field, the DASD further including an actuator for moving the magnetic read head across the magnetic recording disk surface to access the data stored thereon, and a data channel having sense circuitry coupled electrically to the MTJ sensor for detecting changes in resistance of the MTJ sensor caused by rotation of the magnetic moment of the free ferromagnetic layer relative to the fixed magnetic moment of the pinned layer responsive to magnetic fields representing the data stored on the magnet recording disk surface.

In another aspect, the invention is a DASD including a magnetic recording disk having at least one surface for storing magnetically recorded data, a magnetic read head having an ABS disposed for reading the data from the magnetic recording disk surface, the magnetic read head including a MTJ sensor having a MTJ stack with an active region disposed at the ABS and having two opposite sides each disposed generally orthogonally to the ABS, the MTJ stack including an AFM layer spanning the active region, a pinned layer of FM material in contact with the AFM layer, a free layer of FM material spanning the active region, and a tunnel junction layer of electrically nonconductive material disposed between the pinned layer and the free layer in the active region, the MTJ sensor further including a nonconductive longitudinal bias layer formed outside of the active region and in abutting contact with the two opposite sides of the active region for biasing the magnetic moment of the free layer in substantially a predetermined direction in the absence of an external magnetic field, the DASD further including an actuator for moving the magnetic read head across the magnetic recording disk surface to access the data stored thereon, and a data channel having sense circuitry coupled electrically to the MTJ sensor for detecting changes in resistance of the MTJ sensor caused by rotation of the magnetic moment of the free ferromagnetic layer relative to the fixed magnetic moment of the pinned layer responsive to magnetic fields representing the data stored on the magnet recording disk surface.

In still another aspect, the invention is a method for fabricating a magnetic tunnel junction (MTJ) sensor for use in a magnetic read head having an air bearing surface (ABS), the method comprising the unordered steps of (a) forming a MTJ stack with an active region disposed at the ABS and having two opposite sides each disposed generally orthogonally to the ABS, including the unordered steps of (a.1) forming an antiferromagnetic (AFM) layer, (a.2) forming a pinned layer of ferromagnetic (FM) material in contact with the AFM layer, (a.3) forming a free layer of FM material, (a.4) forming a tunnel junction layer of electrically nonconductive material disposed between the pinned layer and the free layer, and (a.5) removing all material outside of the active region from the AFM layer, the pinned layer, and the tunnel junction layer to define the two opposite sides of the active region, and (b) forming a longitudinal bias layer outside of the active region in contact with the free layer for biasing the magnetic moment of the free layer in substantially a predetermined direction in the absence of an external magnetic field.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENTS

Figure 1A:
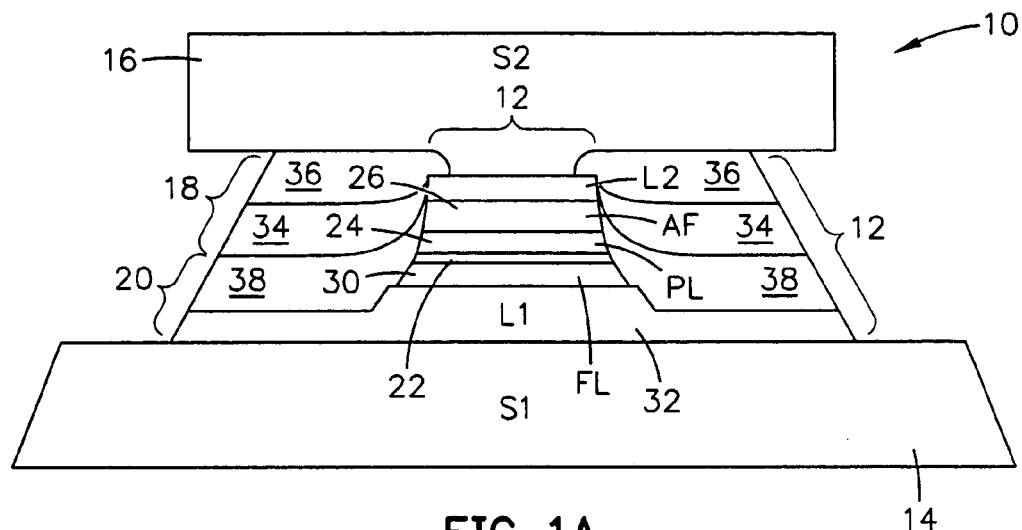
FIGS. 1A and 1B show schematic representations of exemplary magnetic tunnel junction (MTJ) sensors from the prior art wherein the longitudinal biasing layers are sandwiched between two dielectric layers.
Figure 1B:
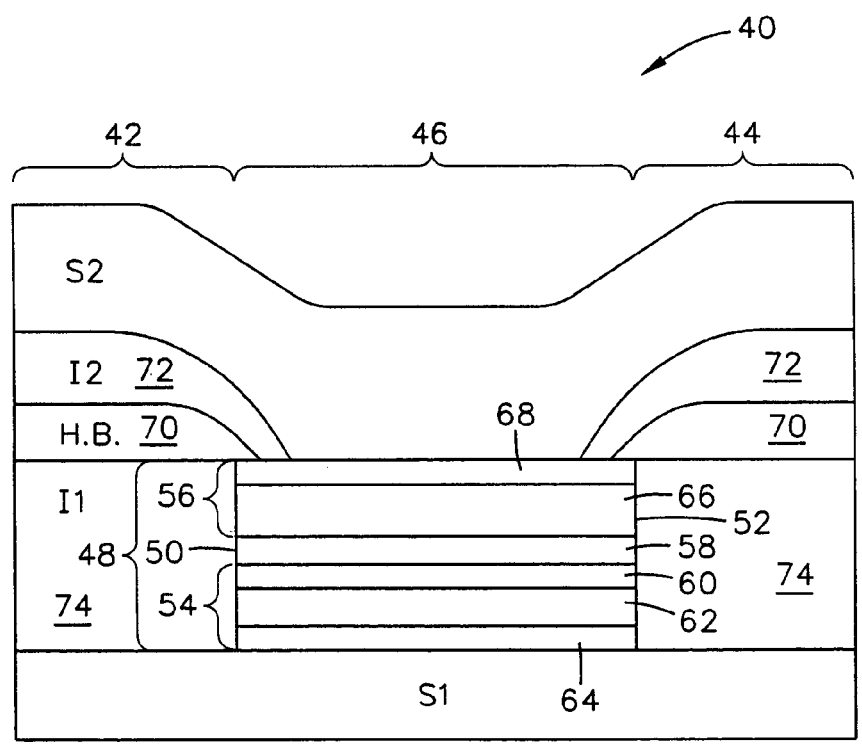
Figure 2A:
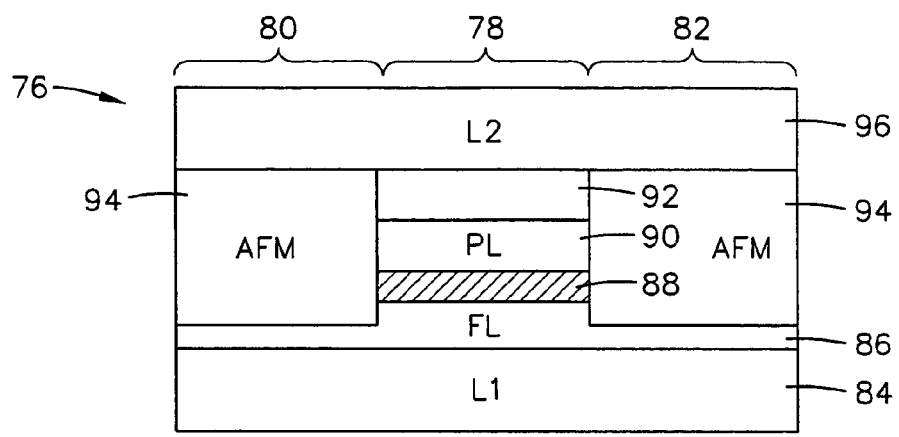
FIGS. 2A and 2B show schematic representations of a MTJ sensor embodiment of this invention wherein non-shunting free-layer stabilization is provided by non-conducting antiferromagnetic (AFM) layers.
Figure 2B:
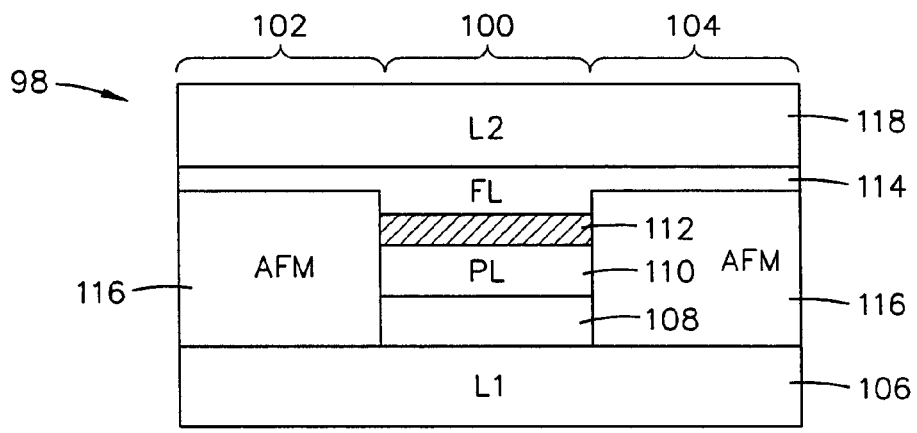

FIGS. 2A and 2B show schematic representations of the air bearing surface (ABS) of exemplary embodiments of the MTJ sensor of this invention wherein the free layer stabilization is provided by non-conducting antiferromagnetic layers made of material such as nickel oxide or certain phases of iron oxide. The MTJ sensor 76 (FIG. 2A) includes a central active region 78 disposed between two side regions 80 and 82. A first lead (L1) layer 84 is a substrate on which the FM free layer 86 is first deposited, followed by the tunnel barrier layer 88, the FM pinned layer (PL) 90 and the first AFM layer 92, which is exchange-coupled to FM pinned layer 90 for the purposes of pinning the magnetic moment of FM pinned layer 90 to the desired direction. The layer stack thus produced is then etched to remove all materials in the end regions 80 and 82 down to FM free layer (FL) 86, a portion of which is left in the side regions 80 and 82 substantially as shown. After the etching step, which defines active region 78 of MTJ sensor 76, the second AFM layer 94 is deposited in direct contact with the portions of free layer 86 remaining in side regions 80 and 82. The material used for AFM layer 94 should be electrically insulating (such as nickel oxide or certain phases of iron oxide). If first AFM layer 92 should be oriented magnetically orthogonally to the magnetic moment second AFM layer 94, the materials should be selected so that the blocking temperatures of AFM layers 92 and 94 differ sufficiently to permit the AFM layer 94 to be magnetically set without disturbing the earlier magnetic settings of first AFM layer 92.

Finally, a second lead (L2) layer 96 is deposited to complete the MTJ sensor 76. FM free layer 86 is stabilized by the exchange-coupling of AFM layer 94 to the portions of FM free layer 86 in the end regions 80 and 82. This is unexpectedly advantageous because the stabilization field is well-controlled using simple easily-repeatable deposition techniques. There is no requirement for careful alignment of tapered layer edges formed using liftoff deposition techniques, nor for sophisticated etching techniques. Because AFM layer 94 is non-conducting, there is no loss of MTJ stack sensitivity through unwanted sensor current shunting.

In contrast with the "top" embodiment of MTJ sensor 76 (FIG. 2A), FIG. 2B shows a representative embodiment of a "bottom" MTJ sensor 98, which is analogous to the "top" MTJ sensor 76. MTJ sensor 98 includes the active region 100 and the side regions 102 and 104. The first lead (L1) layer 106 is used as a substrate for depositing a first AFM layer 108, a FM pinned layer (PL) 110, a tunnel barrier layer 112 and a FM free layer (FL) 114 At this point during the fabrication procedure, all material is etched from the side regions 102 and 104 down to first lead (L1) layer 106 so that no trace of first AFM layer 108 remains. The second AFM layer 116 is then deposited up to the existing level of free layer 114. Additional ferromagnetic material is deposited over both active region 100 and side regions 102 and 104 to complete FM free layer 114 substantially as shown in FIG. 2B. Finally, a second lead (L2) layer 118 is deposited to complete MTJ sensor stack 98. As before, the material used for second AFM layer 116 should be non-conducting to avoid undesired shunting losses to MTJ sensor sensitivity. Also, as discussed above in connection with FIG. 2A, the materials selected for first and second AFM layers 108 and 116 should be chosen to permit the processing of AFM layer 116 without exceeding the blocking temperature of the pre-existing AFM layer 108.

Figure 3A:
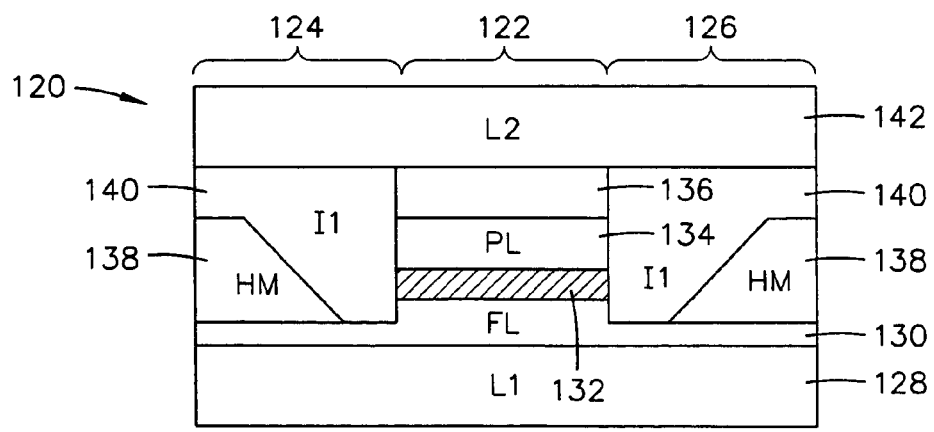
FIGS. 3A and 3B show schematic representations of a MTJ sensor embodiment of this invention wherein non-shunting free-layer stabilization is provided by conductive hard magnetic (HM) layers separated from the MTJ stack by thick insulation layers.
Figure 3B:
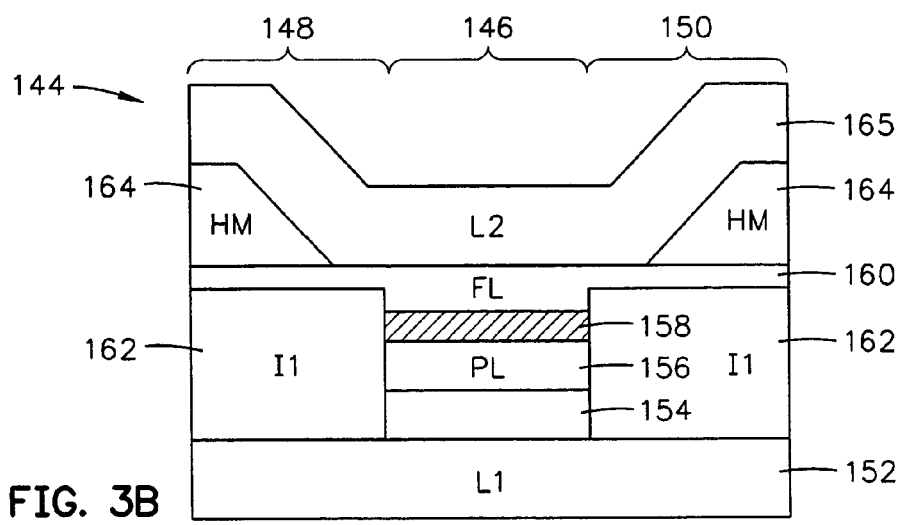

The sensor of this invention may also be embodied using conducting materials for stabilizing the free layer, as is now described. FIGS. 3A and 3B show schematic representations of the ABS of exemplary MTJ sensor embodiments of this invention wherein the free layer stabilization is provided by conductive hard magnetic (HM) layers separated from the MTJ static active region by thick insulation layers. In FIG. 3A, the MTJ sensor 120 is shown with the active region 122 separating the two end regions 124 and 126. This is a "top" MTJ sensor configuration. The first lead (L1) layer 128 is deposited followed by the FM free layer (FL) 130, the tunnel barrier layer 132, the FM pinned layer (PL) 134 and the first AFM layer 136. At this point, all layer materials outside the active region 122 are etched down to but not completely through FM free layer 130. Using masking and liftoff techniques known in the art, a hard magnetic (HM) layer 138 is deposited only within the outer portions of end regions 124 and 126, respectively. A non-conducting insulating layer (I1) 140 is deposited to fill the remaining empty portions of end regions 124 up to the level of first AFM layer 136. Finally, a second lead (L2) layer 142 is deposited to complete the device. MTJ sensor 120 permits excellent free layer stabilization because of the direct contact of a substantial portion of HM layer 138 with FM free layer 130 in end regions 124 and 126 without contact with any part of active region 122, thereby avoiding any loss of sensitivity from undesired shunting of sense current.

FIG. 3B illustrates the "bottom" MTJ sensor 144 equivalent to the "top" MTJ sensor 120 (FIG. 3A). MTJ sensor 144 includes the active region 146 separating the two end regions 148 and 150. Beginning with the first lead (L1) layer 152, the MTJ stack is built beginning with the first AFM layer 154 followed by the FM pinned layer (PL) 156, the tunnel barrier layer 158, and the FM free layer 160. These material layers are then etched in end regions 148 and 150 down to expose first lead (L1) layer 152 and the insulating layer (I1) 162 is then deposited to fill end regions 148 and 150 up to the top of free layer 160, after which additional ferromagnetic material is added to build up free layer (FL) 160 over active region 146 and end regions 148 and 150, substantially as shown. Thereafter, using a combination of masking and liftoff techniques known in the art, the HM layer 164 is deposited in the outer portions of end regions 148 and 150 in direct contact with free layer 160 and, finally, the second lead (L2) layer 165 is deposited to complete MTJ sensor 144.

Figure 4A:
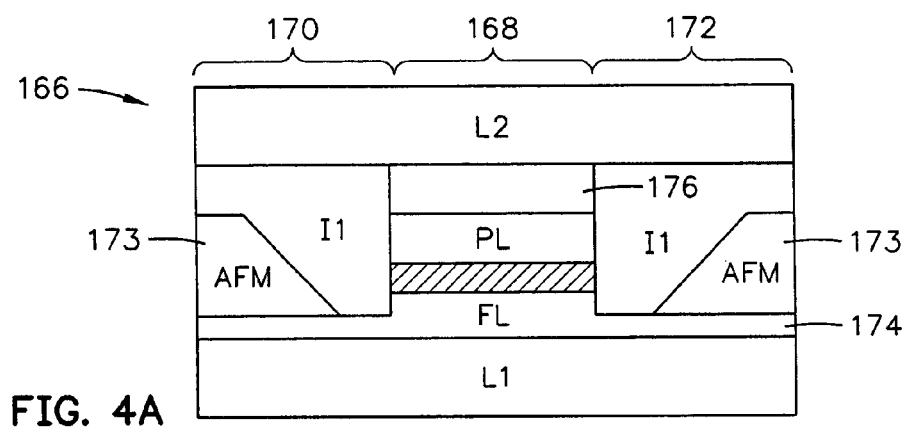
FIGS. 4A and 4B show schematic representations of a MTJ sensor embodiment of this invention wherein non-shunting free-layer stabilization is provided by conductive AFM layers separated from the MTJ stack by thick insulation layers.
Figure 4B:
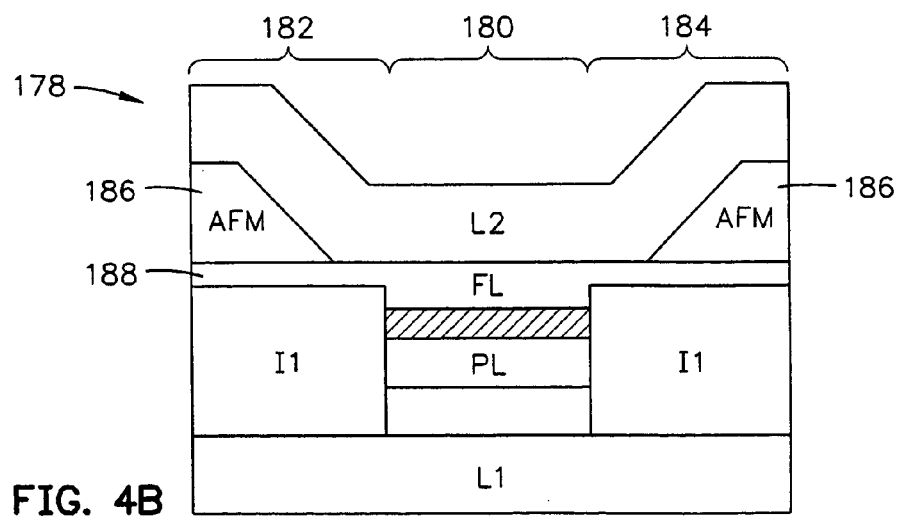

FIGS. 4A and 4B show schematic representations of the ABS of exemplary MTJ sensor embodiments of this invention wherein the free layer stabilization is provided using conductive AFM layers separated from the MTJ stack by thick insulation layers, similarly conceptually to the discussion above in connection with FIGS. 3A and 3B. In FIG. 4A, the top MTJ sensor 166 includes the active region 168 disposed between the two side regions 170 and 172. Operation and fabrication of MTJ sensor 166 in FIG. 4A may be appreciated with reference to the above discussion of FIG. 3A wherein the layers, including FL, PL, I1, L1 and L2, are the same except that, instead of HM layer 138 (FIG. 3A), MTJ sensor 166 uses the conductive AFM layers 173 to provide stabilization of the FM free layer 174. By permitting conductive as well as nonconductive materials to be considered for second AFM layer 173, a wider range of choices is made available for resolving material conflicts between second AFM layer 173 and the first AFM layer 176.

FIG. 4B shows the "bottom" MTJ sensor 178 having the active region 180 disposed between the two end regions 182 and 184. Fabrication and operation of MTJ sensor 178 in FIG. 4B may be understood with reference to the above discussion of FIGS. 3A and 4A wherein the layers, including FL, PL, I1, L1 and L2, are the same. In FIG. 4B, the second AFM layer 186 is disposed directly in contact with the FM free layer 188 in the outer portions of end regions 182 and 184. Again, permitting a wider range of materials to be used for longitudinal stabilization of free layer 188 may resolve otherwise difficult material conflicts.

Figure 7:
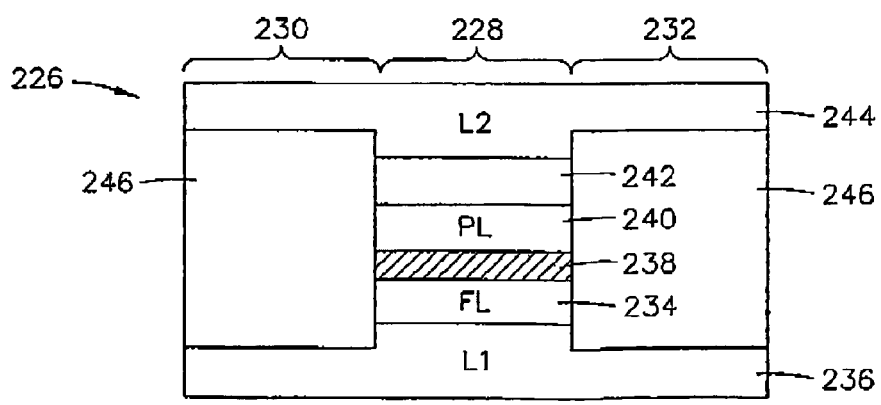
FIG. 7 shows a schematic representation of a MTJ sensor embodiment of this invention wherein non-shunting free-layer stabilization is provided by non-conducting HM layers abutting the free layer and MTJ stack.

FIG. 7 shows a schematic representation of the ABS of an exemplary MTJ sensor embodiment of this invention wherein the free-layer stabilization is provided by non-conducting HM layers abutting the free layer and MTJ stack. The MTJ sensor 226 includes the active region 228 disposed between the two side regions 230 and 232. Fabrication and operation of MTJ sensor 226 may be understood with reference to the above discussion of FIGS. 2A and 2B except that the etching step is conducted completely through the FM free layer (FL) 234 into the first lead (L1) layer 236 so that FM free layer 234 is truncated at the edge of the active region and does not extend into side regions 230–232. The tunnel hauler layer 238, the FM pinned layer (PL) 240, the AFM pinning layer 242 and the first portion of the second lead (L2) layer 244 are also truncated at the edge of active region 228 by the same etch process. A nonconductive HM layer 246 is then deposited in side regions 230–232 using any useful masking and lift-off procedure so that HM layer 246 material fills side regions 230 and 232 and abuts the edges of the MTJ stack layers 234, 238, 240 and 242 to provide stabilization of FM free layer 234 substantially as shown. Finally, the etching mask is removed and the remainder of second lead (L2) layer 244 is deposited to complete MTJ sensor 226. Because HM layer 246 is nonconductive (for example, a nickel-oxide or barium ferrite compound), there is no shunting of sense current flow in active region 228 (the MTJ stack). No thin insulator layers are needed and only one lift-off step is required. Because MTJ sensor 226 is symmetric except for active region 228, it may be readily appreciated that this discussion in connection with FIG. 7 applies to either a "top" or "bottom" MTJ sensor configuration.

Figure 5:
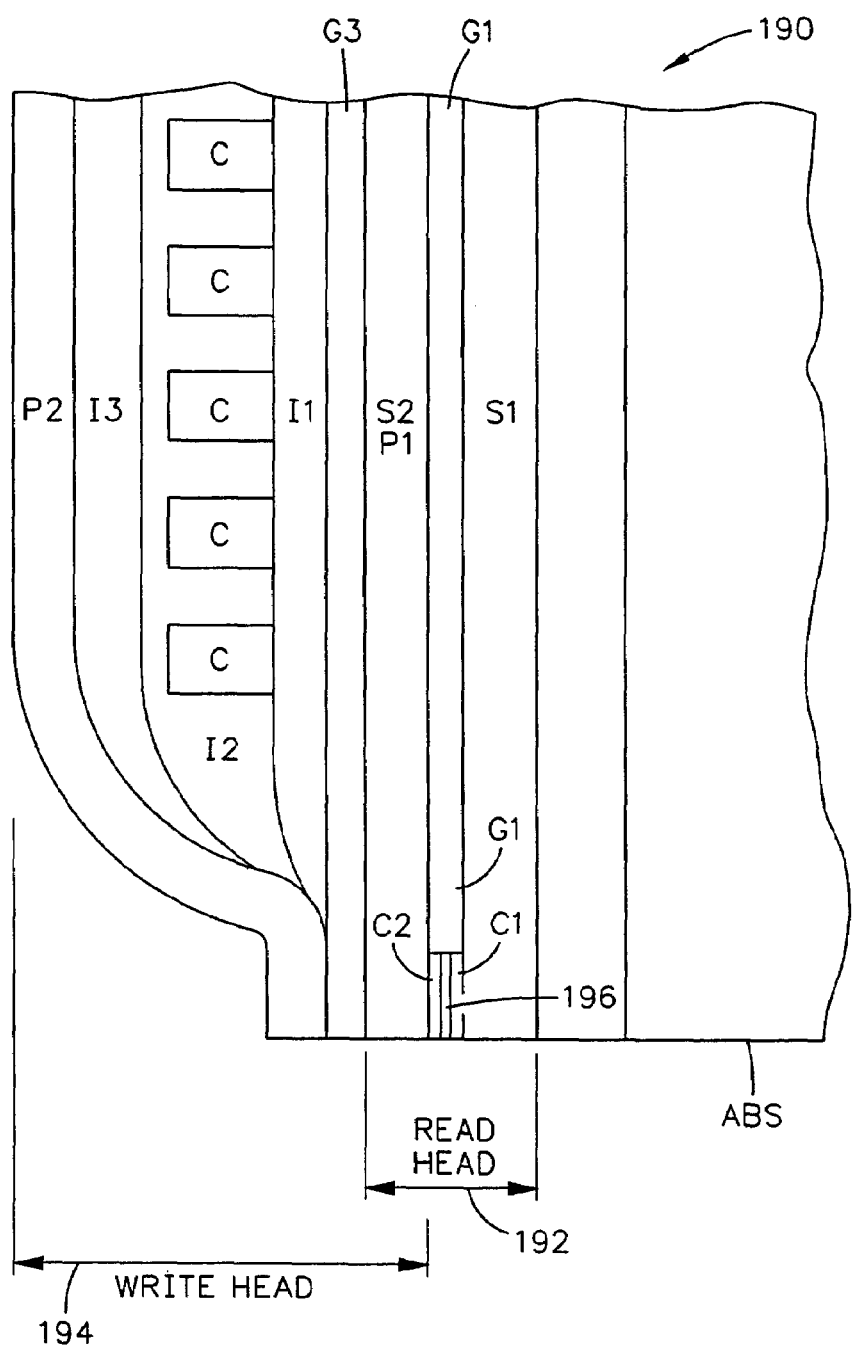
FIG. 5 shows an unscaled schematic representation of a vertical cross-section view of an inductive write/MTJ read head suitable for use with the MTJ sensor of this invention.
Figure 6:
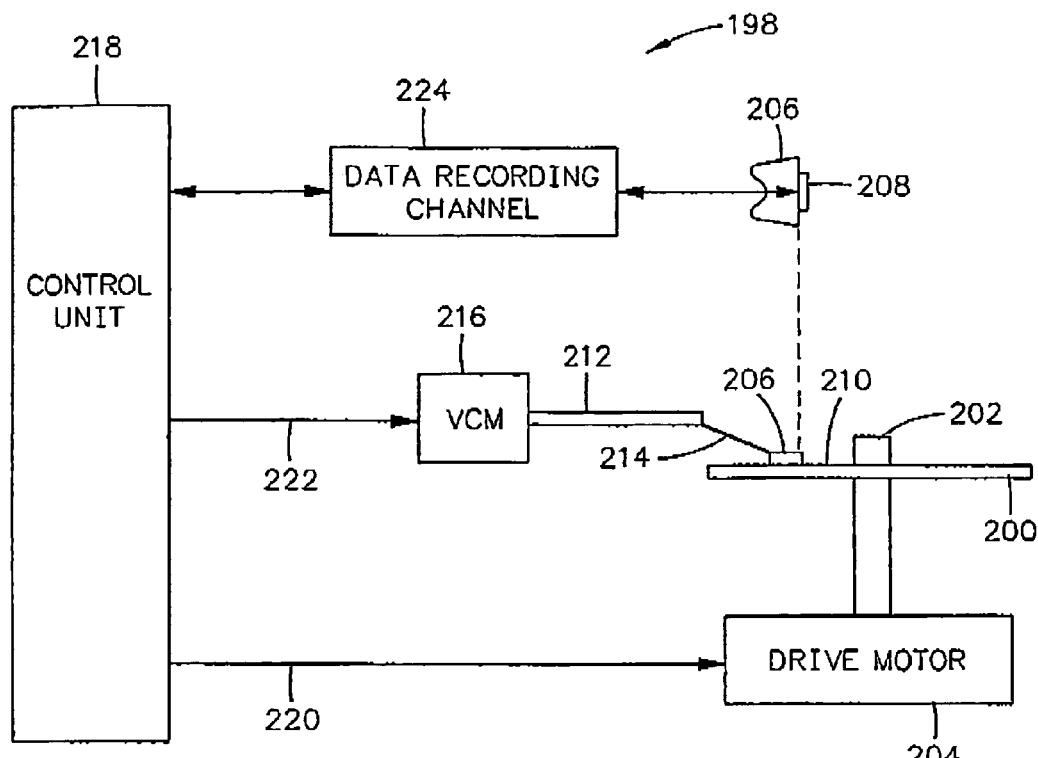
FIG. 6 shows a schematic representation of a direct access storage device (DASD) suitable for use with the MTJ sensor of this invention.

FIG. 5 shows an unscaled schematic representation of a vertical cross section view of an inductive write/read head suitable for use with the MTJ sensor of this invention. FIG. 5 is a cross-sectional schematic view of a read/write head 190 which includes the MTJ read head portion 192 and the magnetic write head portion 194. Head 190 is lapped to form an air bearing surface (ABS), which is spaced from the surface of a rotating disk (FIG. 6) by an air bearing as is well-known in the art. The read head includes a MTJ sensor 196 sandwiched between the first and second conductor layers C1 and C2, which are, in turn, sandwiched between the first and second shield layers S1 and S2 so that the sense current may be conducted to MTJ sensor 196 through shields S1 and S2, which are otherwise separated by the insulating gap layer G1. In a direct access storage device (DASD) of this invention (FIG. 6), MTJ sensor 196 may be one of the preferred embodiments discussed above. In head 190, the write head 194 includes a coil layer C and insulation layer 12, which are sandwiched between the two insulation layers 11 and 13, which are, in turn, sandwiched between first and second pole pieces P1 and P2. A gap layer G3 is sandwiched between the first and second pole pieces P1 and P2 at their pole tips adjacent the ABS for providing a magnetic gap. During writing, signal current is conducted through coil layer C and flux is induced into the first and second pole layers P1, P2 causing flux to fringe across the pole tips at the ABS. This flux magnetizes circular tracks on a rotating disk surface (FIG. 6) during a write operation. During a read operation, the magnetized regions on the rotating disk surface inject external magnetic flux into MTJ sensor 196 of read head 192, thereby inducing changes in the sense current conductivity of sensor 196. These sense current changes are detected by means of sense circuitry for detecting changes in electrical resistance (FIG. 6). The head 190 is denominated a "merged" head in which the second shield layer S2 of the read head is employed as a first pole piece PI for the write head. In a "piggyback" head (not shown), the second shield layer S2 and the first pole piece P1 are embodied as separate layers.

FIG. 6 shows a direct access storage device (DASD) (disk drive) 198 embodying the present invention. As shown, at least one rotatable magnetic disk 200 is supported on a spindle 202 and rotated by a disk drive motor 204. The magnetic recording media on each disk is in the form of an annular pattern of concentric data tracks (not shown) on the surface 210 of disk 200. At least one slider 206 is positioned on the disk 200, each slider 206 supporting one or more magnetic read/write heads 208, where head 208 incorporates the MTJ sensor of this invention as described above in connection with FIG. 5. As the disks rotate, slider 206 is moved radially in and out over the disk surface 210 so that heads 208 may access different portions of disk 200 where desired data is recorded. Each slider 206 is attached to an actuator arm 212 by means of a suspension 214. Suspension 214 provides a slight spring force that biases slider 206 against disk surface 210. Each actuator arm 212 is attached to an actuator 216. As shown in FIG. 3, actuator 216 may be a voice coil motor (VCM), for example. The VCM comprises a coil movable within a fixed magnetic field, the direction and speed of the coil movements being controlled by the motor current signals supplied by a control unit 218.

During operation of DASD 198, the rotation of disk 200 generates an air bearing between slider 206 and the disk surface 210 that exerts an upward force or lift on the slider. The surface of slider 206, which includes head 208 and faces the surface of disk 200, is denominated an air bearing surface ABS). The air bearing thus counterbalances the slight spring force of suspension 214 and supports slider 206 off and slightly above disk surface 210 by a small, substantially constant spacing during normal operation. The various components of DASD 198 are controlled in operation by control signals generated by control unit 218, such as access control signals and internal clock signals (not shown). Typically, control unit 218 includes logic control circuits, storage chips and a microprocessor (not shown). Control unit 218 generates control signals to control various system operations such as drive motor control signals on line 220 and head position and seek control signals on line 222. The control signals on line 222 provide the desired current profiles to optimally move and position slider 206 to the desired data track on disk 200. Read and write signals are communicated to and from the read/write heads 208 by means of the recording channel 224, which includes sense circuitry for detecting changes in electrical resistance in the MTJ sensor in head 208. This description of a typical DASD and the accompanying illustration of FIG. 6 are for representational purposes only. It may be readily appreciated by those skilled in the art that disk storage systems may contain a large number of disks and actuators, and each actuator may support a number of sliders, for example.

Figure 8:
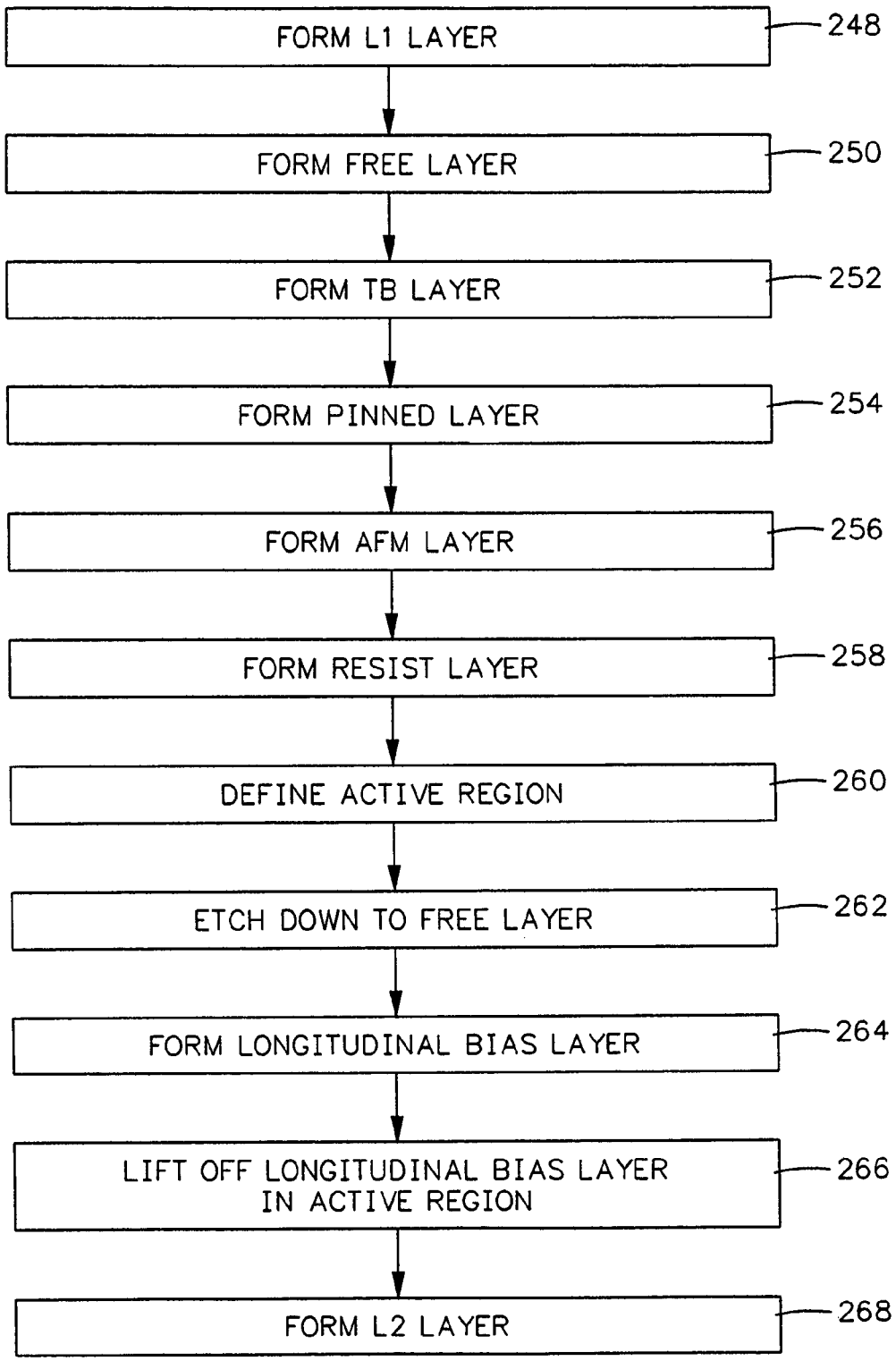
FIG. 8 shows a block diagram illustration of a flow chart illustrating an exemplary method of this invention for fabricating the MTJ sensor of this invention.

FIG. 8 shows a flow chart illustrating an exemplary method of this invention for fabricating the exemplary MTJ sensor 76 (FIG. 2A) of this invention. In the step 248, a first lead (L1) layer formed and serves as a substrate on which the FM free layer is deposited in step 250, followed by the conducting tunnel barrier (TB) layer in the step 252, the FM pinned layer in the step 254 and the first AFM layer in the step 256. Finally, a photoresist layer is added in the step 258 and treated to remove the resist over everything except the active region in the step 260. The layer stack thus produced is then etched in the step 262 to remove all materials in the end regions down to (but not completely through) the FM free layer, a portion of which remains in the side regions. After etching step 262, which defines the MTJ stack, the longitudinal biasing layer is deposited in the step 264 directly over the free layer portions exposed in the side regions. After the remaining photoresist is washed away (together with the unwanted longitudinal bias layer material in the active region) in the step 266, a second lead (L2) layer is deposited in the step 268 to complete the MTJ sensor.

From the above description of the MTJ sensor of this invention, is may be readily appreciated by those skilled in the art that artificial AFM subsystems such as FM/TM/FM sandwiches (where TM includes rubidium, rhenium, chromium and/or copper) may also be used to effectively enhance the stiffness of the exchange biasing where appropriate. Moreover, it may be readily appreciated by those skilled in the art that "current perpendicular to plane" (CPP) giant magnetoresistive (GMR) sensors may be fabricated in accordance with the teachings embodied in the exemplary MTJ sensor embodiments of this invention discussed herein.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

The invention claimed is:

1. In a magnetic read head having en air bearing surface (ABS), a magnetic tunnel junction (MTJ) sensor for connection to sense circuitry for detecting changes in electrical resistance within the sensor, the sensor comprising:
   first and second electrically conductive leads;
   a MTJ stack sandwiched between the first and second electrically conductive leads with an active region disposed at the ABS and having two opposite sides each disposed generally orthogonally to the ABS, the first and second electrically conductive leads extending laterally beyond the active region, the MTJ stack comprising:
      an antiferromagnetic (AFM) layer spanning the active region, a pinned layer of ferromagnetic (FM) material in contact with the AFM layer,
      a free layer of FM material spanning the active region, and
   a tunnel junction layer of electrically nonconductive material disposed between the pinned layer and the free layer in the active region; and
   a nonconductive longitudinal bias layer formed outside of the active region and in abutting contact with the two opposite sides of the active region for biasing the magnetic moment of the free layer in substantially a predetermined direction in the absence of an external magnetic field, the longitudinal bias layer comprising a layer of nickel-oxide extending from the first lead to the second lead.

2. A direct access storage device (DASD) comprising:
   a magnetic recording disk having at least one surface for storing magnetically recorded data;
   a magnetic read head having an air bearing surface (ABS) disposed for reading the data from the magnetic recording disk surface;
   in the magnetic read head, a magnetic tunnel junction (MTJ) sensor comprising: first and second electrically conductive leads;
   a MTJ stack, sandwiched between the first and second electrically conductive leads, with an active region disposed at the ABS and having two opposite sides each disposed generally orthogonally to the ABS, the first and second electrically conductive leads extending laterally beyond the active region, the MTJ stack comprising:
      an antiferromagnetic (AFM) layer spanning the active region, a pinned layer of ferromagnetic (FM) material in contact with the AFM layer,
      a free layer of FM material spanning the active region, and a tunnel junction layer of electrically nonconductive material disposed between the pinned layer and the free layer in the active region; and
   a nonconductive longitudinal bias layer formed outside of the active region and in abutting contact with the two opposite sides of the active region for biasing the magnetic moment of the free layer in substantially a predetermined direction in the absence of an external magnetic field, the longitudinal bias layer comprising a layer of nickel-oxide extending from the first lead to the second lead;
   an actuator for moving the magnetic read head across the magnetic recording disk surface to access the data stored thereon; and
   a data channel having sense circuitry coupled electrically to the MTJ sensor for detecting changes in resistance of the MTJ sensor caused by rotation of the magnetic moment of the free ferromagnetic layer relative to the fixed magnetic moment of the pinned layer responsive to magnetic fields representing the data stored on the magnetic recording disk surface.

* * * * *